US010650821B1

(12) United States Patent
Nicholls et al.

(10) Patent No.: US 10,650,821 B1
(45) Date of Patent: May 12, 2020

(54) TAILORING AN INTERACTIVE DIALOG APPLICATION BASED ON CREATOR PROVIDED CONTENT

(71) Applicant: Google LLC, Mountain View, CA (US)

(72) Inventors: Leon Nicholls, Santa Clara, CA (US); Joshua Williams, Menlo Park, CA (US); Uri First, Sunnyvale, CA (US); Nandini Stocker, Hamburg (DE)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/790,102

(22) Filed: Feb. 13, 2020

Related U.S. Application Data

(63) Continuation of application No. 16/654,673, filed on Oct. 16, 2019, now Pat. No. 10,573,315, which is a
(Continued)

(51) Int. Cl.
*G10L 15/22* (2006.01)
*G06N 20/00* (2019.01)
(Continued)

(52) U.S. Cl.
CPC .............. *G10L 15/22* (2013.01); *G06F 9/451* (2018.02); *G06F 40/216* (2020.01);
(Continued)

(58) Field of Classification Search
CPC ... G10L 15/30; G10L 15/22; G10L 2015/088; G10L 13/043; G10L 15/18;
(Continued)

(56) References Cited

U.S. PATENT DOCUMENTS

2003/0167167 A1 9/2003 Gong
2006/0100875 A1 5/2006 Schmidt et al.
(Continued)

FOREIGN PATENT DOCUMENTS

WO 9957714 A1 11/1999
WO 2005081508 A1 9/2005

OTHER PUBLICATIONS

"Build your first app." Login with GitHub TODO, Aug. 29, 2017, https://wit.ai/docs/quickstart. 3 pages.
(Continued)

*Primary Examiner* — Kile O Blair
(74) *Attorney, Agent, or Firm* — Middleton Reutlinger

(57) ABSTRACT

Implementations relate to executing a tailored version of a dynamic interactive dialog application, where the tailored version is tailored based on structured content that is specified by a creator of the tailored version. Executing the tailored version of the interactive dialog application can be in response to receiving, via an assistant interface of an assistant application, an invocation phrase assigned to the tailored version and/or other user interface input that identifies the tailored version. In some implementations, a tailored version of a dynamic interactive dialog application is executed with persona value(s) that are specified by a creator of the tailored version and/or that are predicted based on structured content and/or other input provided by the creator in creating the tailored version. In some implementations, structured content and/or other input provided by a creator in creating a tailored version of an interactive dialog application is utilized in indexing the tailored version.

17 Claims, 10 Drawing Sheets

Related U.S. Application Data continuation of application No. 15/838,278, filed on Dec. 11, 2017, now Pat. No. 10,453,456.

(60) Provisional application No. 62/567,729, filed on Oct. 3, 2017.

(51) Int. Cl.

| | |
|---|---|
| ***G10L 15/18*** | (2013.01) |
| ***G06N 7/00*** | (2006.01) |
| ***G06F 40/295*** | (2020.01) |
| ***G06F 40/253*** | (2020.01) |
| ***G06F 40/216*** | (2020.01) |
| ***G06F 40/35*** | (2020.01) |
| ***G06F 9/451*** | (2018.01) |
| *G10L 13/027* | (2013.01) |

(52) U.S. Cl.

CPC .......... *G06F 40/253* (2020.01); *G06F 40/295* (2020.01); *G06F 40/35* (2020.01); *G06N 7/005* (2013.01); *G06N 20/00* (2019.01); *G10L 15/1815* (2013.01); *G10L 15/1822* (2013.01); *G10L 13/027* (2013.01); *G10L 2015/223* (2013.01)

(58) Field of Classification Search

CPC . G10L 2015/223; G10L 15/285; G10L 15/28; G10L 2015/228; G10L 13/04; G10L 13/047; G10L 13/027

See application file for complete search history.

(56) References Cited

U.S. PATENT DOCUMENTS

2013/0152092 A1 6/2013 Yadgar
2018/0108343 A1 4/2018 Stevans et al.

OTHER PUBLICATIONS

Catanzariti, Patrick. “How to Build Your Own AI Assistant Using Api.Ai—SitePoint.” SitePoint, SitePoint, May 23, 2017, www.sitepoint.com/how-to-build-your-own-ai-assistant-using-api-ai/. 20 pages.

Microsoft. “QnA Maker.” Accessed Dec. 11, 2017. https://qnamaker.ai/Documentation/CreateKb. 2 pages.

European Patent Office, International Search Report and Written Opinion of PCT Ser. No. PCT/US2018/054123; 16 pages; dated Feb. 12, 2019.

210 215 220

| | QUESTION | CORRECT | INCORRECT1 | INCORRECT2 | INCORRECT3 |
|---|---|---|---|---|---|
| 205a | Who is the first president of the United States? | George Washington | John Adams | Alexander Hamilton | George W. Bush |
| 205b | Who was president during the Civil War? | Abraham Lincoln | Andrew Johnson | James Buchanan | Woodrow Wilson |
| 205c | Who said "We have nothing to fear but fear itelf?" | Franklin Delano Roosevelt | Theodore Roosevelt | Harry Truman | Woodrow Eilson |
| 205d | What president's real name was Leslie Lynch King, Jr. | Gerald Ford | Jimmy Carter | Richard Nixon | Lyndon Johnson |

FIG. 2

TAILORING AN INTERACTIVE DIALOG APPLICATION BASED ON CREATOR PROVIDED CONTENT

BACKGROUND

An automated assistant (also known as "personal assistant", "mobile assistant", etc.) may be interacted with by a user via a variety of client devices, such as smart phones, tablet computers, wearable devices, automobile systems, standalone personal assistant devices, and so forth. An automated assistant receives input from the user (e.g., typed and/or spoken natural language input) and responds with responsive content (e.g., visual and/or audible natural language output). An automated assistant interacted with via a client device may be implemented via the client device itself and/or via one or more remote computing devices that are in network communication with the client device (e.g., computing device(s) in "the cloud").

SUMMARY

This specification is directed generally to methods, apparatus, and computer readable media for executing a tailored version of a dynamic interactive dialog application, where the tailored version is tailored based on structured content that is specified by a creator of the tailored version. Executing the tailored version of the interactive dialog application can be in response to receiving, via an assistant interface of an assistant application, an invocation phrase assigned to the tailored version and/or other user interface input that identifies the tailored version. Executing the tailored version can include generating multiple instances of user interface output for presentation via the assistant interface. Each of the multiple instances of user interface output is for a corresponding dialog turn during execution of the interactive dialog application and each of the multiple instances is generated through adaptation of the dynamic interactive dialog application using the structured content. For example, various variables of the dynamic interactive dialog application can be populated with values that are based on the creator specified structured content, thereby adapting the interactive dialog application to the structured content.

As described herein, multiple tailored versions of a dynamic interactive dialog application can be executed, where each of the tailored versions is executed based on corresponding structured content specified by a corresponding creator. For example, in executing a first tailored version, first values that are based on first structured content specified by a first creator can be utilized for various variables of the dynamic interactive dialog application; in executing a second tailored version, second values that are based on second structured content specified by a second creator can be utilized various variables of the dynamic interactive dialog application can be populated with; etc.

In these and other manners, the same fixed code can be executed for each of multiple tailored versions—while adapting, in the execution of each tailored version, only variables that are specified by the creator in the structured content for that version, specified by other user interface input of the creator in generating that version, and/or predicted based on the structured content and/or other user interface input for that version. This can lead to a reduction in computational resources that are necessary to create an interactive dialog application. For example, a creator of a tailored version of a dynamic interactive dialog application can utilize computational resources in specifying variables through structured content and/or other input, and those variables utilized to adapt the interactive dialog application as described above (and elsewhere herein). However, the creator need not utilize significant computational resources in specifying various code for full execution of the tailored version, as the fixed code of the dynamic interactive dialog application is instead utilized. Moreover, this can lead to reduction in the amount of computer hardware storage space needed to store multiple applications. For example, the variables for each of multiple tailored versions can be stored—without requiring a unique instance of the fixed code to be stored for each of the multiple tailored versions.

In some implementations described herein, a tailored version of a dynamic interactive dialog application is executed with one or more persona values that are specified by a creator of the tailored version and/or that are predicted based on structured content and/or other input provided by the creator in creating the tailored version. The persona values can be utilized for one or more of the variables of the interactive dialog application to thereby also adapt the interactive dialog application based on the persona values. Each of the persona values can influence audible and/or graphical user interface output that is generated in execution of the tailored version.

For example, one or more persona values can define the tone, intonation, pitch, and/or other voice characteristics of a computer generated speech to be provided as natural language user interface output in execution of the tailored version. Also, for example, one or more persona values can define term(s), phrase(s), and/or a degree of formality to be utilized for various user interface outputs, such as user interface outputs defined in the fixed code (i.e., those not defined in the specified structured content). For instance, one or more persona values for a first tailored version can result in various natural language user interface outputs being provided that are very formal (e.g., exclude colloquialisms and/or other casual utterances), while one or more persona values for a second tailored version can result in various natural language user interface outputs being provided that are very casual (i.e., a low degree of formality). Also, for instance, one or more persona values for a first tailored version can result in various natural language user interface outputs being provided that include terms that are specific to a first region (without including terms specific to a second region), while one or more persona values for a second tailored version can result in various natural language user interface outputs being provided that are include terms that are specific to the second region (without including terms specific to the first region). As yet another example, one or more persona values can define music, sound effects, graphical properties, and/or other features that are provided as user interface output.

Executing a tailored version of a dynamic interactive dialog application with persona values for the tailored version can result in the tailored version providing more understandable, and more natural user interface outputs, thereby facilitating more effective communication with a user. For example, techniques described herein can allow a tailored version to convey meaning to a particular user using language and/or phrasing which resonates with the user. For instance, as described herein the persona values can be determined based on the structured content utilized to execute the tailored version, and resultantly adapted to users that are more likely to invoke the tailored version. Adaptation of the natural language user interface outputs based on the persona values may make the overall duration, of an interactive dialog engaged in through execution of the tailored version, shorter than it would otherwise need to be, thereby saving computational load in the computing system(s) executing the tailored version.

As mentioned above, in various implementations one or more persona values are predicted based on structured content and/or other input provided by the creator in creating the tailored version. The predicted values can be automatically assigned to the tailored version and/or presented to the creator as suggested persona values and, if affirmed by the creator via user interface input, assigned to the tailored version. In many of those implementations, the persona values are predicted based on processing, using a trained machine learning model, of at least some of the structured content and/or other input provided in creating the tailored version. For example, at least some of the structured content can be applied as at least part of input to the trained machine learning model, the input processed using the machine learning model to generate one or more output values, and the persona values selected based on the one or more output values. The trained machine learning model can be trained, for example, based on training instances that are each generated based on previously submitted structured content in generating a corresponding previous tailored version, and based on previously submitted persona values (e.g., explicitly selected by a corresponding creator) for the corresponding previous tailored version.

In some implementations described herein, structured content and/or other input provided by a creator in creating a tailored version of an interactive dialog application is utilized in indexing of the tailored version. For example, the tailored version can be indexed based on one or more invocation phrases provided by a creator for the tailored version. As another example, the tailored version can additionally or alternatively be indexed based on one or more entities that are determined based on the structured content specified by the creator. For instance, at least some of the entities may be determined based on having a defined relationship (e.g., in a knowledge graph) to a plurality of entities having aliases included in the structured content. Such entities can be utilized to index the tailored version, even though an alias of such entities is not included in the structured content. For example, structured content can include aliases for a large quantity of points of interest in a given city, but not include any alias for the given city. The aliases for the points of interest, and optionally other content, can be utilized to identify, in a knowledge graph, entities corresponding to the points of interest. Further, it can be determined that all of the entities have a defined relationship (e.g., a "located in" relationship), in the knowledge graph, to the given city. Based on the defined relationship, and based on multiple (e.g., at least a threshold) of the entities having the defined relationship, the tailored version can be indexed based on the given city (e.g., indexed by one or more aliases of the given city). Thereafter, a user can discover the tailored version through submission of user interface input that references the given city. For example, a user can provide spoken input, via an automated assistant interface, of "I want an application about [alias for given city]". Based on the tailored version being indexed based on the given city, an automated assistant associated with the automated assistant interface can automatically execute the tailored version—or can cause output to be presented to the user that indicates the tailored version as an option for execution, and can execute the tailored version if affirmative user interface input is received in response to the presentation. In these and other manners, tailored version(s) of dynamic dialog applications that satisfy a request of a user can be efficiently identified and executed. This can prevent a user from needing to submit multiple requests to identify such tailored versions, thereby conserving computational and/or network resources.

In some implementations, a method performed by one or more processors is provided that includes: receiving, via one or more network interfaces: an indication of a dynamic interactive dialog application, structured content for executing a tailored version of the dynamic interactive dialog application, and at least one invocation phrase for the tailored version of the dynamic interactive dialog application. The indication, the structured content, and the at least one invocation phrase are transmitted in one or more data packets generated by a client device of a user in response to interaction with the client device by the user. The method further includes the steps of: processing the structured content to automatically select a plurality of persona values for the tailored version of the interactive dialog application, wherein the structured content does not explicitly indicate the persona values. Subsequent to receiving the indication, the structured content, and the at least one invocation phrase, and subsequent to automatically selecting the plurality of persona values, the method includes the steps of: receiving natural language input provided via an assistant interface of the client device or an additional client device of an additional user; and determining the natural language input matches the invocation phrase for the tailored version of the interactive dialog application. In response to determining the natural language input matches the invocation phrase, the method includes executing the tailored version of the interactive dialog application, wherein executing the tailored version of the interactive dialog application includes generating multiple instances of output for presentation via the assistant interface, each of the multiple instances of output being for a corresponding dialog turn during execution of the interactive dialog application and being generated using the structured content and using a corresponding one or more of the persona values.

These and other implementations of technology disclosed herein may optionally include one or more of the following features.

In various implementations, processing the structured content to automatically select the plurality of persona values may include: applying, as input to a trained machine learning model, at least some of the structured content; processing the at least some of the structured content using the trained machine learning model to generate one or more output values; and selecting the persona values based on the one or more output values. In various implementations, the one or more output values may include a first probability for a first persona and a second probability for a second persona, and selecting the persona values based on the one or more output values may include: selecting the first persona over the second persona based on the first probability and the second probability; and selecting the persona values based on the persona values being assigned, in at least one database, to the selected first persona. In other various implementations, the method may further include: applying, as additional input to the trained machine learning model, the indication of the dynamic interactive dialog application; and processing, using the trained machine learning model, the indication and the at least some of the structured content to generate the one or more output values.

In various implementations, processing the structured content to automatically select the plurality of persona values may include: determining one or more entities based on the structured content; applying, as input to a trained machine learning model, at least some of the entities; processing the at least some of the entities using the trained machine learning model to generate one or more output values; and selecting the persona values based on the one or more output values.

In various implementations, prior to processing the at least some of the structured content using the trained machine learning model, the method may further include: identifying, from one or more databases, multiple previous user submissions, each of the previous user submissions including previously submitted structured content and corresponding previously submitted persona values, the previously submitted persona values being explicitly selected by a corresponding user; generating a plurality of training instances based on the previous user submissions, each of the training instances being generated based on a corresponding one of the previous user submissions and including training instance input that is based on the previously submitted structured content of the corresponding one of the previous user submissions and training instance output that is based on the previously submitted persona values of the corresponding one of the previous user submissions; and training the trained machine learning model based on the plurality of training instances. In some of those implementations, the training the machine learning model may include: processing, using the trained machine learning model, the training instance input of a given training instance of the training instances; generating a predicted output based on the processing; generating an error based on comparing the predicted output to the training instance output of the given training instance; and updating the trained machine learning model based on backpropagation using the error.

In various implementations, processing the structured content may include parsing the structured content from a document specified by the user.

In various implementations, wherein the persona values may be related to at least one of tone of the dialog, grammar of the dialog, and non-verbal sounds provided with the dialog.

In another aspect, a method performed by one or more processors is provided that includes: receiving, via one or more network interfaces: an indication of a dynamic interactive dialog application, and structured content for executing a tailored version of the dynamic interactive dialog application, wherein the indication and the structured content are transmitted in one or more data packets generated by a client device of a user in response to interaction with the client device by the user; processing the structured content to determine one or more related entities; indexing the tailored version of the dynamic interactive dialog application based on the one or more related entities; subsequent to the indexing: receiving natural language input provided via an assistant interface of the client device or an additional client device of an additional user; determining one or more invocation entities from the natural language input; identifying a mapping of entities, the mapping including at least one of the invocation entities and at least one of the related entities; identifying the tailored version of the dynamic interactive dialog application based on the relationships between the invocation entities and the related entities in the mapping. Based on identifying the tailored version of the interactive dialog application, the method includes executing a dynamic version of the interactive dialog application, wherein executing the dynamic version of the interactive dialog application includes generating multiple instances of output for presentation via the assistant interface, each of the multiple instances of output being for a corresponding dialog turn during execution of the interactive dialog application and being generated using at least some of the structured content of the tailored version of the interactive dialog application.

These and other implementations of technology disclosed herein may optionally include one or more of the following features.

In various implementations, processing the structured content to determine the one or more related entities may include: parsing the structured content to identify one or more terms; identifying one or more entities with one or more of the terms as aliases; and determining a given related entity, of the one or more related entities, based on the given related entity having a defined relationship with multiple of the identified one or more entities.

In various implementations, no alias of the given entity may be included in the structured content. In some of those implementations, determining the given related entity is further based on the given related entity having the defined relationship with at least a threshold quantity of the multiple of the identified one or more entities.

In various implementations, the method may further include: receiving, via one or more processors, at least one invocation phrase for the tailored version of the dynamic interactive dialog application; and further indexing the tailored version of the dynamic interactive dialog application based on the at least one invocation phrase.

In various implementations, the method may further include: weighting the related entities based on the structured content and relationships between the related entities. In some of those implementations, identifying the tailored version may be further based on the weights of the related entities. In other implementations, the method may further include: identifying a second tailored version of the dynamic interactive dialog application based on the input entities and the related entities; and selecting the tailored version based on the weights.

In various implementations, the method may further include: identifying a second tailored version, with second structured content and second version related entities, based on the input entities and the second version related entities, wherein each of the multiple instances of output are generated using at least some of the structured content and some of the second structured content.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 2 is an example of structured content that may be utilized in implementations disclosed herein.

DETAILED DESCRIPTION

In some instances, a tailored version of an interactive dialog application is generated based on received structured content and a received indication of the interactive dialog application. The structured content and the indication can be transmitted to an automated assistant, or a component associated with the automated assistant, in response to one or more user interface inputs provided by a creator via interaction with client devices of the creator. The indication of the interactive dialog application is utilized to identify the interactive dialog application, and the structured content is utilized in executing the tailored version of the interactive dialog application. Various types of structured content can be provided and utilized in executing the tailored version of the interactive dialog application. For example, the structured content can be a spreadsheet that includes prompts and possible responses, such as multiple-choice questions and corresponding answers (e.g., for each question, a correct answer and one or more incorrect answers), jokes and corresponding punchlines (e.g., for each joke, a corresponding punchline), etc. As another example, a structured HTML or XML document may be provided, or even an unstructured document that is processed and converted to a structured document.

In some implementations, one or more persona values can be assigned to the tailored version, and the persona values utilized in executing the tailored version. The persona values can indicate: audible characteristics of voice output, grammar characteristics to be used in generating the natural language for the voice output, and/or particular terms and/or phrases (e.g., that are in addition to the structured content) to be provided in voice output. For example, the persona values can collectively define a discrete persona, such as a queen (e.g., female voice with proper grammar), a robot (e.g., exaggerated automated voice with stiff speaking tone), and/or a teacher. In some implementations, persona values may be different characteristics of the presenting voice of the automated assistant which may vary, such as a tone value, a grammar value, and a sex value that may be changed to create different personas. In some implementations, one or more of the persona values can be utilized to select, from a plurality of candidate voice-to-text models, a particular voice-to-text model that conforms to the persona value(s). In some implementations, one or more of the persona values can be utilized to select corresponding characteristics to utilize in voice-to-text conversion.

Figure 1:
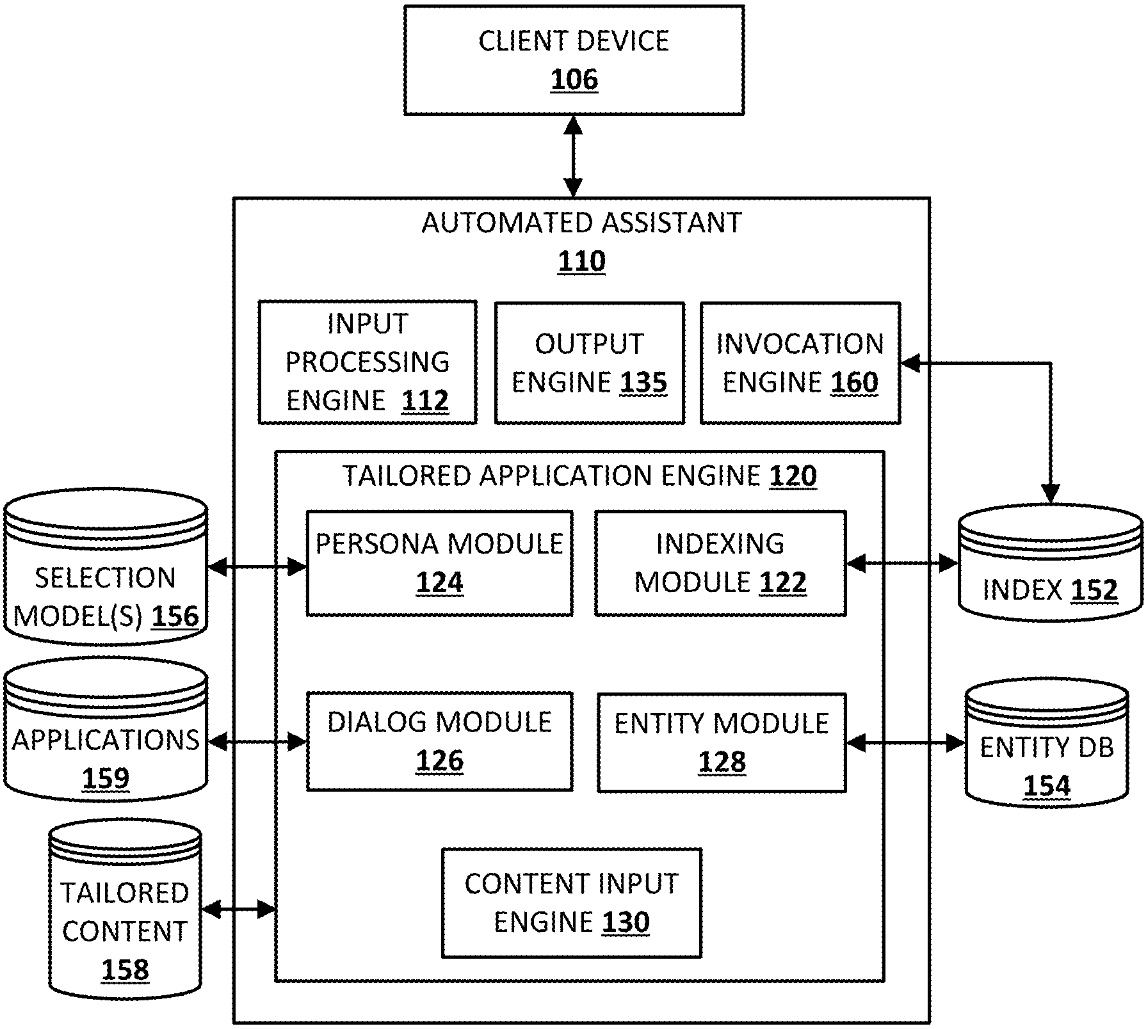
FIG. 1 is a block diagram of an example environment in which implementations disclosed herein may be implemented.

Turning now to the Figures, FIG. 1 illustrates an example environment in which techniques disclosed herein may be implemented. The example environment includes a client device 106, an automated assistant 110, and a tailored application engine 120. In FIG. 1, the tailored application engine 120 is illustrated as part of the automated assistant 110. However, in many implementations the tailored application engine 120 may be implemented by one or more components that are separate from the automated assistant 110. For example, the tailored application engine 120 may interface with the automated assistant 110 over one or more networks and may optionally interface with the automated assistant 110 utilizing one or more application programming interfaces (APIs). In some implementations where the tailored application engine 120 is separate from the automated assistant 110, the tailored application engine 120 is controlled by a third-party that is unique from a party that controls the automated assistant 110.

The client device 106 may be, for example, a standalone voice-activated speaker device, a desktop computing device, a laptop computing device, a tablet computing device, a mobile phone computing device, a computing device of a vehicle of the user, and/or a wearable apparatus of the user that includes a computing device (e.g., a watch of the user having a computing device, glasses of the user having a computing device, a virtual or augmented reality computing device). Additional and/or alternative client devices may be provided.

Although automated assistant 110 is illustrated in FIG. 1 as separate from the client device 106, in some implementations all or aspects of the automated assistant 110 may be implemented by the client device 106. For example, in some implementations input processing engine 112 may be implemented by the client device 106. In implementations where one or more (e.g., all) aspects of automated assistant 110 are implemented by one or more computing devices remote from the client device 106, the client device 106 and those aspects of the automated assistant 110 communicate via one or more networks, such as a wide area network (WAN) (e.g., the Internet). As described herein, the client device 106 can include an automated assistant interface via which a user of the client device 106 interfaces with the automated assistant 110.

Although only one client device 106 is illustrated in combination with the automated assistant 110, in many implementations the automated assistant 110 may be remote and may interface with each of a plurality of client devices of the user, and/or with each of a plurality of client device of multiple users. For example, the automated assistant 110 may manage communications with each of the multiple devices via different sessions and may manage multiple sessions in parallel. For instance, the automated assistant 110 in some implementations may be implemented as a cloud-based service employing a cloud infrastructure, e.g., using a server farm or cluster of high performance computers running software suitable for handling high volumes of requests from multiple users. However, for the sake of simplicity, many examples herein are described with respect to a single client device 106.

The automated assistant 110 includes an input processing engine 112, an output engine 135, and an invocation engine 160. In some implementations, one or more of the engines of automated assistant 110 may be omitted, combined, and/or implemented in a component that is separate from automated assistant 110. Moreover, automated assistant 110 may include additional engines not illustrated herein for the sake of simplicity. For example, automated assistant 110 may include a dialog state tracking engine, its own dialog engine (or can share the dialog module 126 with tailored application engine 120), etc.

The automated assistant 110 receives instances of user input from the client device 106. For example, the automated assistant 110 may receive free-form natural language voice input in the form of a streaming audio recording. The streaming audio recording may be generated by the client device 106 in response to signals received from a microphone of the client device 106 that captures spoken input of a user of the client device 106. As another example, the automated assistant 110 may receive free-form natural language typed input. In some implementations, the automated assistant 110 may receive non-free-form input from a user, such as selection of one of multiple options on a graphical user interface element—or structured content provided (e.g., in a separate spreadsheet document or other document) in generating of a tailored version of an interactive dialog application. In various implementations, the input is provided at the client device via an automated assistant interface via which a user of the client device 106 interacts with the automated assistant 110. The interface can be an audio-only interface, a graphical-only interface, or an audio and graphical interface.

In some implementations, user input may be generated by the client device 106 and/or provided to the automated assistant 110 in response to an explicit invocation of the automated assistant 110 by a user of the client device 106. For example, the invocation may be detection by the client device 106 of certain voice input of the user (e.g., an automated assistant 110 hot word/phrase such as "Hey Assistant"), user interaction with a hardware button and/or virtual button (e.g., a tap of a hardware button, a selection of a graphical interface element displayed by the client device 106), and/or other particular user interface input. In some implementations, automated assistant 110 may receive user input that indicates (directly or indirectly) a particular application that is executable (directly or indirectly) by the automated assistant 110. For example, input processing engine 112 may receive, from the client device 106, input of "Assistant, I want to play my President's quiz". Input processing engine 112 may parse the received audio and provide the parsed content to invocation engine 160. Invocation engine 160 can utilize the parsed content to determine (e.g., utilizing index 152) that "President's quiz" is an invocation phrase for a tailored version of a dynamic interactive dialog application. In response, the invocation engine 160 can transmit an invocation command to tailored application engine 120 to cause the tailored application engine 120 to execute that tailored version and engage in an interactive dialog with a user of the client device 106 via an automated assistant interface.

The automated assistant 110 typically provides an instance of output in response to receiving an instance of user input from the client device 106. The instance of output may be, for example, audio to be audibly presented by the device 106 (e.g., output via a speaker of the client device 106), text and/or graphical content to be graphically presented by the device 106 (e.g., rendered via a display of the client device 106), etc. As described herein, when executing a tailored version of an interactive dialog application, the output provided at a given dialog turn can be generated by tailored application engine 120 based on the interactive dialog application, and based on structured content for the tailored version and/or persona values for the tailored version. As used herein, a dialog turn references a user utterance (e.g., an instance of voice input or other natural language input) and a responsive system utterance (e.g., an instance of audible and/or graphical output), or vice versa.

The input processing engine 112 of automated assistant 110 processes natural language input received via client devices 106 and generates annotated output for use by one or more other components of the automated assistant 110, such as invocation engine 160, tailored application engine 120, etc. For example, the input processing engine 112 may process natural language free-form input that is generated by a user via one or more user interface input devices of client device 106. The generated annotated output includes one or more annotations of the natural language input and optionally one or more (e.g., all) of the terms of the natural language input. As another example, the input processing engine 112 may additionally or alternatively include a voice to text module that receives an instance of voice input (e.g., in the form of digital audio data), and converts the voice input into text that includes one or more text words or phrases. In some implementations, the voice to text module is a streaming voice to text engine. The voice to text module may rely on one or more stored voice-to-text models (also referred to as language models) that each may model a relationship between an audio signal and phonetic units in a language, along with word sequences in the language.

In some implementations, the input processing engine 112 is configured to identify and annotate various types of grammatical information in natural language input. For example, the input processing engine 112 may include a part of speech tagger configured to annotate terms with their grammatical roles. For example, the part of speech tagger may tag each term with its part of speech such as "noun," "verb," "adjective," "pronoun," etc. Also, for example, in some implementations the input processing engine 112 may additionally and/or alternatively include a dependency parser configured to determine syntactic relationships between terms in natural language input. For example, the dependency parser may determine which terms modify other terms, subjects and verbs of sentences, and so forth (e.g., a parse tree)—and may make annotations of such dependencies.

The output engine 135 provides instances of output to the client device 106. In some situations, an instance of output may be based on responsive content generated by tailored application engine 120 in executing a tailored version of an interactive dialog application. In other situations, the instance of output may be based on responsive content generated by another application that is not necessarily a tailored version of an interactive dialog application. For example, the automated assistant 110 may itself include one or more internal applications that generate responsive content and/or may interface with third-party applications that are not tailored version of interactive dialog applications, and that generate responsive content. In some implementations, the output engine 135 may include a text to speech engine that converts textual components of responsive content to an audio format, and the output provided by the output engine 135 is in an audio format (e.g., as streaming audio). In some implementations, the responsive content may already be in an audio format. In some implementations, the output engine 135 additionally or alternatively provides textual reply content as output (optionally for conversion by the device 106 to audio) and/or provides other graphical content as output for graphical display by the client device 106.

The tailored application engine 120 includes an indexing module 122, a persona module 124, a dialog module 126, an entity module 128, and a content input engine 130. In some implementations, module(s) of tailored application engine 120 may be omitted, combined, and/or implemented in a component that is separate from the tailored application engine 120. Moreover, tailored application engine 120 may include additional modules not illustrated herein for the sake of simplicity.

Content input engine 130 processes content provided by a creator for generating a tailored version of an interactive dialog application. In some implementations, the content provided includes structured content. For example, referring to FIG. 2, an example of structured content is provided. The structured content can be transmitted to the content input engine 130 from the client device 106, or from another client device (e.g., a client device of another user). The structured content of FIG. 2 is a spreadsheet, with each row 205*a-d* of the spreadsheet including an entry in a question column 210, an entry in a correct answer column 215, and an entry in each of three incorrect answer columns 220. In some implementations, the headers of the columns of the spreadsheet of FIG. 2 can be prepopulated by the tailored application engine 120 and the entries in each of the rows can be populated by a creator utilizing a corresponding client device and utilizing the headers as guidance. In some of those implementations, the tailored application engine 120 prepopulates the headers based on which, of multiple available interactive dialog applications, the creator indicates he/she desires to create a tailored version for. For example, the headers of FIG. 2 can be prepopulated based on a creator selecting a "trivia" interactive dialog application. On the other hand, if the user selected a "jokes" interactive dialog application, headers of "joke" and "punchline" can instead be prepopulated.

The content input engine 130 can receive the structured content of FIG. 2, optionally process the content, and store the content in tailored content database 158 for utilization in executing a tailored version of a corresponding interactive dialog application. Processing the content can include annotating and/or storing the entries provided by the user based on the columns and rows for the entries. For example, the content input engine 130 can store the entry of column 210, row 205A and annotate it as a "question" entry for the tailored version. Further, the content input engine 130 can store the entry of column 215, row 205A, and annotate it as a "correct answer" entry for the preceding stored "question" entry—and can store the entries of columns 220, row 205A, and annotate them as "incorrect answer" entries for the preceding store "question" entry. Processing the content can additionally and/or alternatively include verifying that values of the structured content conform to one or more required criteria, and prompting the creator to correct if not. The one or more required criteria can include a content type (e.g., numeric only, alphabetic only), content length (e.g., X characters and/or Y terms), etc.

The content input engine 130 can also store, in association with the structured content for a tailored version, an indication of the corresponding interactive dialog application, any provided invocation phrase(s) for the tailored version, and any selected and/or predicted persona value(s) for the tailored version. Although a spreadsheet is illustrated in FIG. 2, it is understood that content input engine 130 can process other types of structured content. Moreover, in some implementations content input engine 130 can convert non-structured content into a structured format, and then process the structured format.

The dialog module 126 executes a tailored version of an interactive dialog application using the application and structured content for the tailored version, optionally along with additional value(s) for the tailored version (e.g., persona value(s)). For example, the dialog module 126 can execute a given tailored version of a given interactive dialog application by retrieving fixed code for the given interactive dialog application from applications database 159, and retrieving structured content and/or other content for the given version from tailored content database 158. The dialog module 126 can then execute the given tailored version utilizing the fixed code for the given interactive dialog application and the tailored content for the tailored version.

In executing a tailored version of an interactive dialog application, the dialog module 126 engages in multiple dialog turns. In each dialog turn the dialog module 126 can provide content to output engine 135, and output engine 135 can provide the content (or a conversion thereof) as user interface output to be presented (audibly or graphically) at the client device 106. The output provided can be based on the interactive dialog application and the structured content and/or persona values. Moreover, the output provided at many dialog turns can be based on user utterance(s) (of the dialog turn and/or prior dialog turn(s)) and/or system utterances of prior dialog turns (e.g., a "dialog state" determined based on past user and/or system utterance(s)). User utterances of the dialog turns can be processed by input processing engine 112, and output from the input processing engine 122 utilized by the dialog module 126 in determining responsive content to provide. While many instances of output will be based on the interactive dialog application and the structured content, it is noted that some instances of the output can be based on the interactive dialog application without reference to the structured content. For example, the interactive dialog application can include fixed code that enables response to various user inputs utilizing only the fixed code and/or with reference to other content that is not provided by the creator. In other words, while many dialog turns during execution of a tailored version will be influenced by provided structured content, some dialog turns will not.

In some implementations, in executing a tailored version of an interactive dialog application, the dialog module 126 can additionally and/or alternatively customize one or more instances of output for a given user based on performance of the given user. The performance of the given user can include performance in one or more earlier dialog turns of the current execution of the tailored version and/or performance in one or more interactive dialogs with the given user in prior execution(s) of the tailored version, and/or for prior execution(s) of other tailored versions and/or other interactive dialog application(s). For example, if the interactive dialog application is a trivia application, and the given user has struggled to correctly answer questions, hints can proactively be provided along with questions in one or more outputs and/or persona values can be adjusted to be more "encouraging". For example, output provided in response to wrong answers in executing a tailored version of a trivia application can initially be "Wrong, Wrong, Wrong", but adapted to "Good answer, but not correct—please try again" in response to the user incorrectly answering at least a threshold quantity of questions. Such adaptation can be accomplished via adaptation of one or more persona values. As another example, output provided in response to correct answers in executing a tailored version of a trivia application can initially be "Correct, great work", but adapted to simply "Correct" (e.g., to speed up the dialog) in response to the user performing well and/or the pace of the dialog slowing down. Performance data of a given user (e.g., score, number of errors, time spent, and/or other data) can be persisted through execution of a tailored version, and even across multiple instances of execution of the tailored version (and/or other tailored versions and/or other applications), and utilized to customize the experience of the given user through adaptation of one or more outputs. In some implementations, such user-performance specific adaptation in executing a tailored version can be accomplished through adaptation of persona value(s), which can include further adaptation of one or more persona values that are already adapted based on structured content of the tailored version and/or other feature(s).

The persona module 124 utilizes the creator provided structured content of a tailored version and/or other content to select one or more persona values for a tailored version of an interactive dialog application. The persona module 124 can store the persona values in the tailored content database 158, in association with the tailored version. The selected persona values are utilized by dialog module 126 in execution of the tailored version. For example, the selected persona values can be utilized in selecting grammar, tone, and/or other aspects of speech output to be provided in one or more dialog turns during execution of the tailored version. The persona module 124 may utilize various criteria in selecting persona values for a tailored version. For example, persona module 124 may utilize the structured content of the tailored version, the invocation phrase(s) of the tailored version, entities associated with the structured content (e.g., as described below with respect to entity module 128), the corresponding interactive dialog application (e.g., is it of the type quiz, joke, list of facts, or transportation scheduler), etc. In some implementations, the persona module 124 may utilize one or more selection models 156 in selecting one or more persona values. As described herein, the persona module 124 can automatically select and implement one or more persona value(s) for a tailored version and/or can select one or more persona values and require confirmation by the creator prior to implementation for the tailored version.

A persona is a discrete personality and is comprised of a collection of persona values, some of which may be predetermined to reflect that particular type of persona. For example, personas may include "queen," "king," "teacher," "robot," and/or one or more other distinct types. Each persona may be represented by a plurality of persona values, each reflecting a particular aspect of a persona, and each of the discrete personas may have a preset value for each (or may be limited in the values that may be assigned). As an example, a persona may be a collection of persona values and include a speaking voice characteristic, a grammar characteristic, and a non-verbal sound characteristic (e.g., music played between question rounds of a quiz). A "Queen" persona may have SPEAKING VOICE=(VALUE 1), GRAMMAR=(VALUE 2), and SOUND=(VALUE 3) as persona values. The "Teacher" persona may have SPEAKING VOICE=(VALUE 4), GRAMMAR=(VALUE 5), and SOUND=(VALUE 6) as persona values. In some implementations, a persona may be selected for a tailored version and the corresponding persona values may be set based on the persona values that comprise that persona. For example, techniques described herein for selecting persona values may select the persona values by first selecting a persona, identifying the persona values that constitute that selected persona, and set the persona values of the tailored versions accordingly. In some implementations, one or more of the persona values may not be part of a persona and may be set independently of the persona when a persona is selected. For example, a "Teacher" persona may not have a "GENDER" persona value set, and a persona value indicative of "Male" or "Female" may be independently assigned to "Teacher" personas.

Entity module 128 utilizes terms and/or other content provided in received structured content, to determine one or more entities that are referenced in the structured content, and optionally one or more entities that are related to such referenced entities. The entity module 128 can utilize entity database 154 (e.g., a knowledge graph) in determining such entities. For example, structured content can include the terms "president," "George Washington," and "Civil War". Entity module 128 can identify, from entity database 154, entities associated with each of the terms. For example, the entity module 128 can identify an entity associated with the first president of the United States based on "George Washington" being an alias for that entity. The entity module 128 can optionally identify one or more additional entities that are related to such referenced entities, such as an entity associated with "U.S. Presidents" based on the "George Washington" having a "belongs to the group" relationship with a "U.S. Presidents" entity.

The entity module 128 can provide determined entities to indexing module 122 and/or persona module 124. Indexing modules 122 can index the tailored version, corresponding to the structured content, based on one or more entities determined based on the structured content. Persona module 124 can utilize one or more of the entities in selecting one or more persona values for the tailored version.

Figure 3:
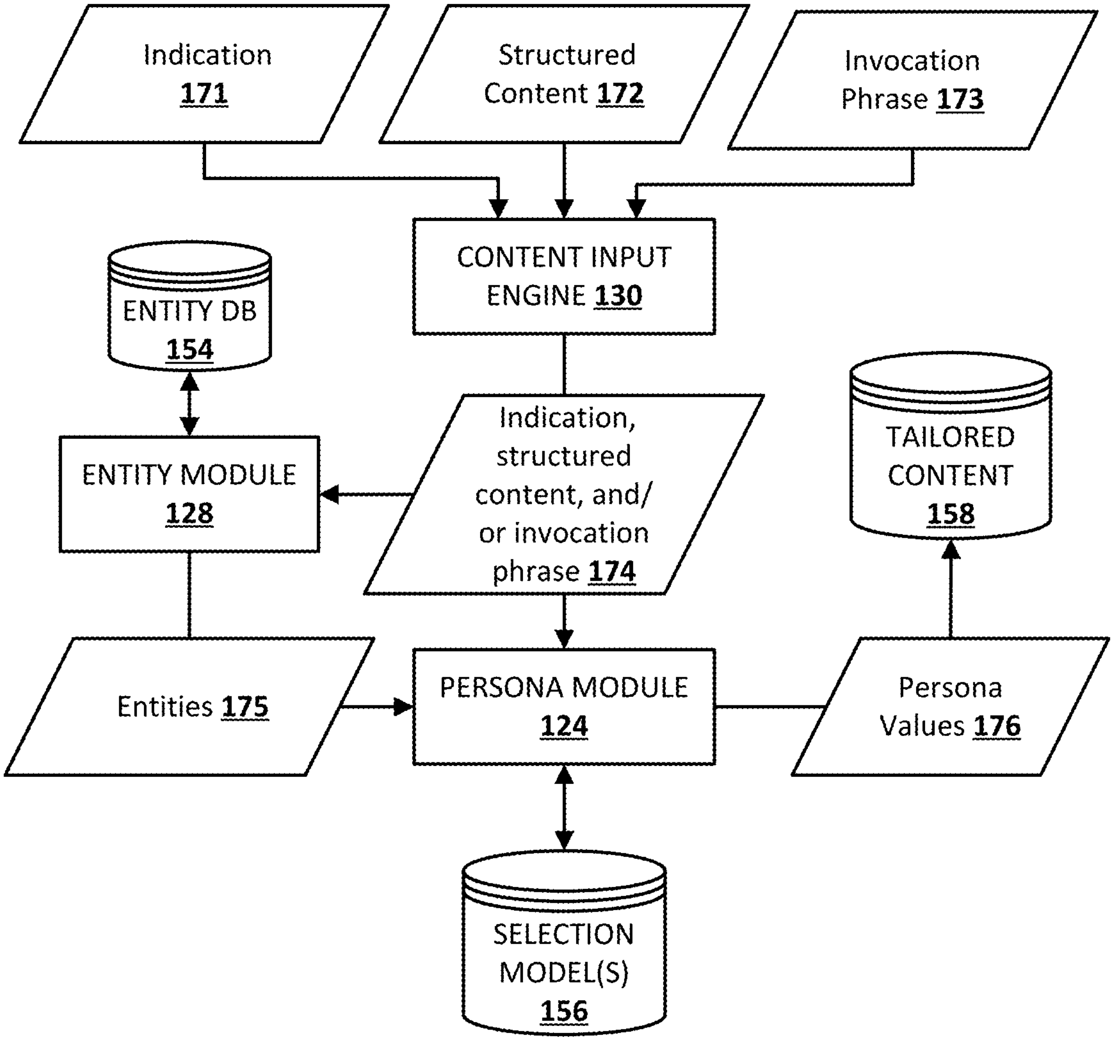
FIG. 3 illustrates an example of how persona values may be selected for a request to generate a tailored version of a dynamic interactive dialog application.

Referring now to FIG. 3, an example is provided of how persona values can be selected for a request to generate a tailored version of a dynamic interactive dialog application. The content input engine 130 receives an indication 171 of an interactive dialog application to tailor. This may be, for example, an indication of a quiz application, an indication of a joke application, or an indication of a transportation query application. The indication can be received in response to a creator selecting a graphical element that corresponds to the interactive dialog application, speaking term(s) that correspond to the interactive dialog application, or otherwise indicating a desire to provide structured content for the interactive dialog application. Further, the content input engine 130 receives structured content. For example, for an indication 171 of a quiz application, the content input engine 130 may receive a document that includes the content illustrated in FIG. 2. Further still, content input engine 130 receives an invocation phrase 173. For example, for the structured content of FIG. 2, a creator can provide an indication phrase 173 of "Presidential Trivia."

Content input engine 130 provides the indication, at least some of the structured content, and/or the invocation phrase 174 to the persona module 124 and/or the entity module 128. The entity module 128 utilizes the indication, at least some of the structured content, and/or the invocation phrase 174 to identify, using entity database 154, entities 175 referenced in one or more of those items, and provides the entities 175 to the persona module 124.

The persona module 124 uses at least one of the selection models, and the data 174 and/or 175, to select one or more persona values 176. For example, the persona module 124 can process the data 174 and/or 175 utilizing one of the selection models that is a machine learning model, and generate, based on the processing, output that indicates the persona values 176. For example, the output can indicate a probability for each of a plurality of discrete personas, one of those personas selected based on the probability (e.g., a "Queen" persona), and the persona values 176 can be a collection of persona values that constitute that persona. As another example, the output can include a probability for each of multiple persona values, and a subset of those persona values selected based on the probabilities.

As an example, for structured content that is for an elementary school quiz, persona module 124 can select persona value(s) that cause a corresponding tailored version to provide spoken output that is "slower", to provide less than all possible incorrect answers as options for response to a question, to provide encouraging feedback as responsive output to even incorrect answers, and/or to limit word usage to terms that would be known to a child. For instance, the selected persona values can cause "Close, but not quite! Try again!" to be provided as responsive content when an incorrect response is received, whereas for structured content that is for an adult audience, persona module 124 can alternative select persona value(s) that cause output of "Wrong, Wrong, Wrong" to be provided when an incorrect answer is received.

In some implementations, persona module 124 can additionally and/or alternatively select persona value(s) based on attribute(s) of a given user for which a tailored version is being executed. For example, when a tailored version is being executed for a given user that has an "adult" attribute, persona module 124 can select persona value(s) based on such attribute (and optionally additional attribute(s)). In these and other manners, persona value(s) of a given tailored version can be adapted on a "per-user" basis, thereby tailoring each version of the tailored application to the user for which it is being executed. Machine learning model(s) can optionally be trained and utilized in selection of such persona value(s) based on attribute(s) of a user for which a tailored version is being executed. For example, the machine learning model(s) can utilize training examples that are based on explicit selections, by users for which a tailored version is being executed, where the explicit selections indicate one or more persona values that such user(s) desire to be utilized in executing of the tailored version. The training examples can also optionally be based on structured content of the tailored version. For example, the machine learning model(s) can be trained to predict one or more persona values based on attribute(s) of a user for which a tailored version is being executed and based on structured content and/or other features of the tailored version.

The persona values 176 can be stored in the tailored content database 158, along with the structured content 172, the indication 171, and/or the invocation phrase. Collectively, such values can define a tailored version of the interactive dialog application. A subsequent user may provide natural language speech to the automated assistant, which then may identify terms in the natural language input and identify that the terms correspond to the invocation phrase 173 of the tailored version. For example, the invocation engine 160 (FIG. 1) can process received user interface input to determine which, if any, of a plurality of previously submitted tailored versions of the interactive dialog application is being invoked. In some implementations, when a tailored version of the application is generated, the creator may provide an invocation phrase to be utilized in the future to invoke the application. In some implementations, one or more entities may be identified as related to the structured content, and the invocation engine 160 may select one or more of the tailored versions based on user input and the related entities.

Figure 4:
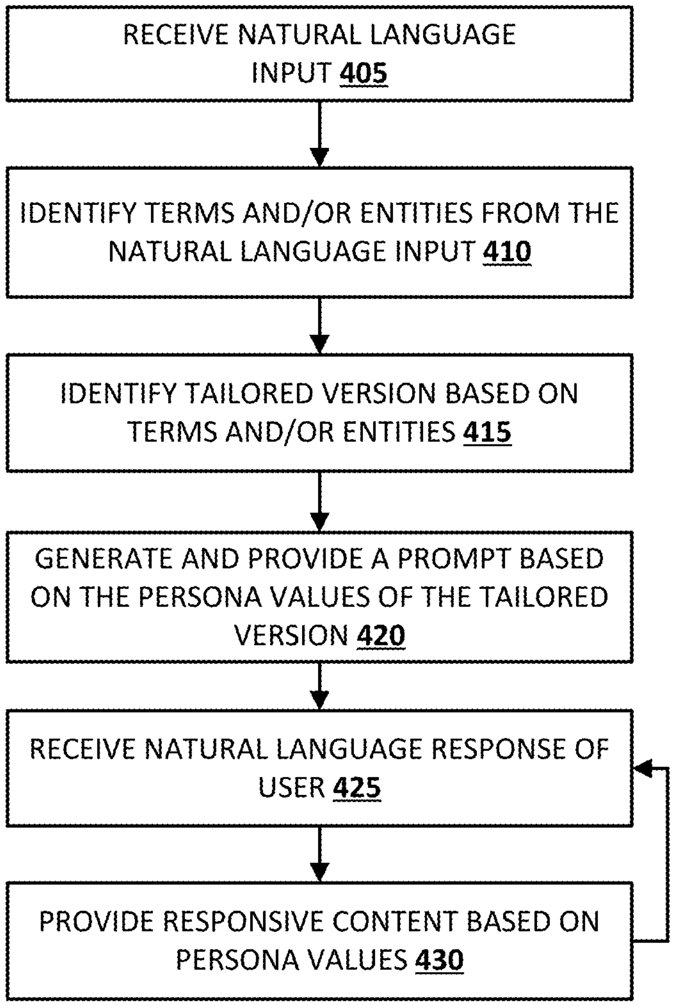
FIG. 4 is a flowchart illustrating an example method according to implementations disclosed herein.

FIG. 4 is a flowchart providing an example of how a tailored version of an interactive dialog application is executed for a subsequent user based on structured content and persona values of the tailored version. For convenience, the operations of the flow chart of FIG. 4 are described with reference to a system that performs the operations. This system may include various components of various computer systems. Moreover, while operations of the method of FIG. 4 are shown in a particular order, this is not meant to be limiting. One or more operations may be reordered, omitted or added.

At block 405, natural language input is received from a user. The natural language may be received by a component sharing one or more characteristics with input processing engine 112 of FIG. 1.

At block 410, one or more terms are identified in the natural language input. For example, the term(s) can be identified by a component that shares one or more characteristics with input processing engine 112. Further, entities associated with one or more of the terms may optionally be identified. For example, the entities can be determined from an entity database by a component that shares one or more characteristics with entity module 128.

At block 415, a previously generated tailored version, with automatically selected persona values, is identified based on the terms and/or entities in the natural language input. In some implementations, the previously generated tailored version may be identified based on the natural language input matching an invocation phrase that is associated with the tailored version. In some implementations, the tailored version may be identified based on identified relationships between segments of the natural language input and one or more entities that are associated with the tailored version, as described in greater detail herein.

At block 420, a prompt is generated by dialog module 126. The prompt may then be provided to the user via the output engine 135. For example, dialog module 126 may generate a text prompt based on the persona values and/or the structured content and provide the text to the output engine 135, which may convert the text to speech and provide the speech to the user. When generating prompts, dialog module 126 may vary the grammar, word usage, and/or other characteristics of the prompt based on the persona values. Further, when providing a speech version of text generated by the dialog model 126, output engine 135 may vary the tone, sex, speed of speaking, and/or other characteristics of the outputted speech based on one or more of the persona values of the invoked tailored version of the application. In some implementations of block 420, the prompt can be a "starting" prompt that is always provided for the tailored version in an initial iteration.

At block 425, a natural language response of the user is received. The natural language response may be analyzed by a component sharing characteristics with the input processing engine 112, which then may determine one or more terms and/or entities from the input.

At block 430, responsive content is provided. The responsive content can be generated based on the received input of block 425, the structured content of the tailored version, and the persona value(s) of the tailored version.

After the responsive content is provided, an additional natural language response of the user can be received at another iteration of block 425, and additional responsive content again generated and provided at another iteration of block 430. This may continue until the tailored version is completed, an instance of a natural language response at block 425 indicates a desire to cease interaction with the tailored version, and/or other condition(s) are satisfied.

Figure 5:
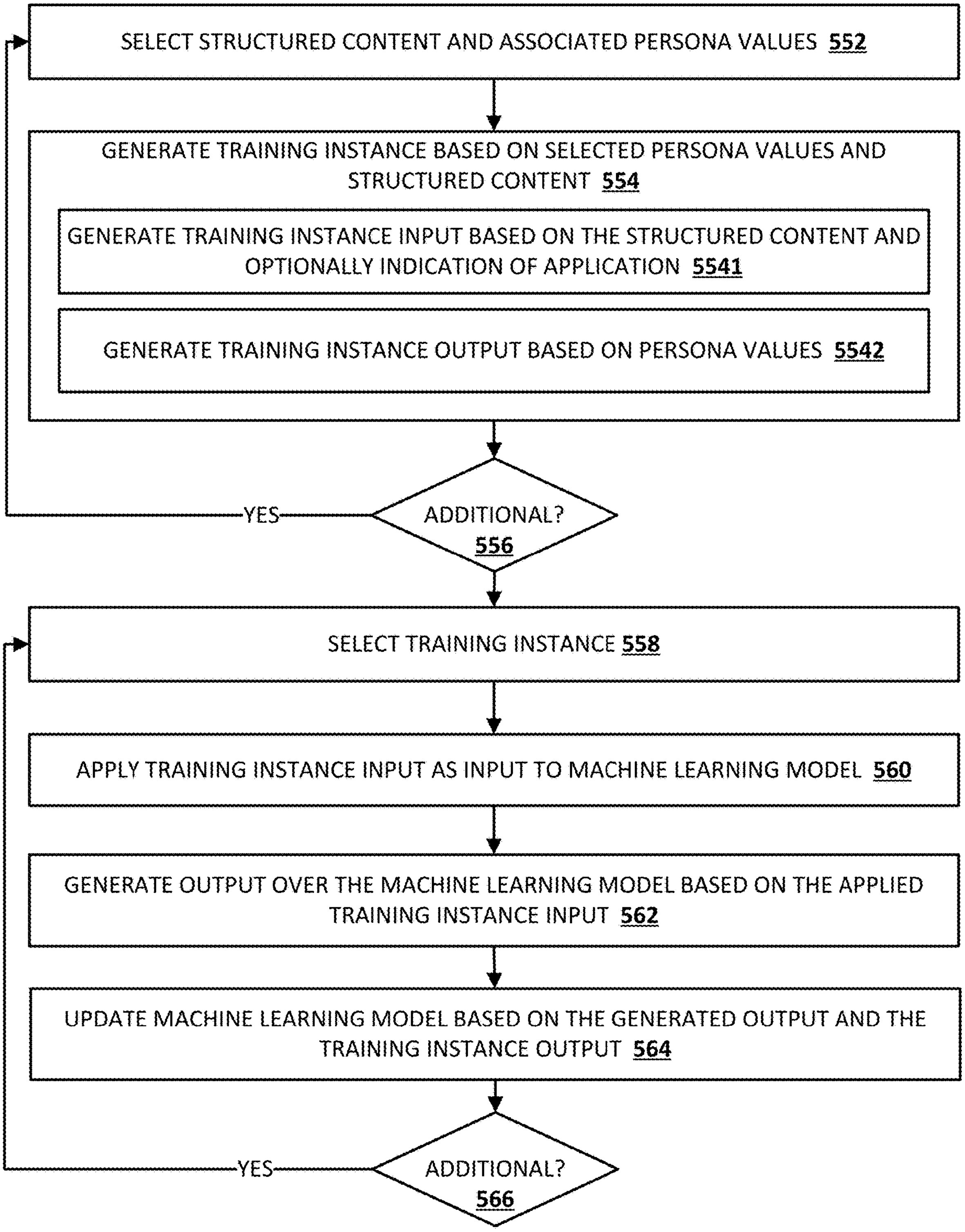
FIG. 5 is a flowchart illustrating an example method of generating a persona selection model according to implementations disclosed herein.

FIG. 5 is a flowchart illustrating another example method according to implementations disclosed herein. FIG. 5 illustrates an example of training a machine learning model (e.g., a neural network model) for utilization in selecting persona values. For convenience, the operations of the flow chart of FIG. 5 are described with reference to a system that performs the operations. This system may include various components of various computer systems. Moreover, while operations of the method of FIG. 5 are shown in a particular order, this is not meant to be limiting. One or more operations may be reordered, omitted or added.

At block 552, the system selects the structured content and persona values of a tailored version of an interactive dialog application. As one example, the structured content and persona values may be selected from database 158, and the persona values may have been explicitly indicated by a corresponding creator and/or confirmed as desired persona values by the corresponding creator.

At block 554, the system generates a training instance based on the structured content and the persona values. Block 554 includes sub-blocks 5541 and 5542.

At sub-block 5541, the system generates training instance input of the training instance based on the structured content and optionally based on an indication of the interactive dialog application to which the tailored version corresponds. In some implementations, the system additionally or alternatively generates training instance input of the training instance based on entities determined based on the structured content. As one example, the training instance input can include an indication of the interactive dialog application, and a subset of terms from the structured content, such as a title and the first X terms, or the X most frequently occurring terms. For instance, the training instance input can include the 50 terms of the structured content with the highest TFIDF values, along with a value that indicates the interactive dialog application. As another example, the training instance input can include an indication of the interactive dialog application, as well as an embedding of some (or all) of the terms (and/or other content) of the structured content. For example, the embedding of the terms of the structured content can be a Word2Vec embedding generated utilizing a separate model.

At sub-block 5542, the system generates training instance output of the training instance based on the persona values. For example, the training instance output can include X outputs, each representing a discrete persona. For a given training instance, the training instance output can include a "1" (or other "positive" value) for the output corresponding to the discrete persona to which the persona values of block 552 conform, and a "0" (or other "negative" value) for all other outputs. As another example, the training instance output can include Y outputs, each representing a persona characteristic. For a given training instance, the training instance output can include, for each of the Y outputs, a value indicating the persona value, of persona values of block 552, for the persona characteristic that is represented by the output. For instance, one of the Y outputs can indicate a degree of "formalism", and the training instance output for that output can be "0" (or other value) if the corresponding persona value of block 552 is "informal", and a "1" (or other value) if the corresponding persona value of block 552 is "formal".

At block 556, the system determines whether there are additional tailored versions of interactive dialog applications to process. If so, the system repeats blocks 552 and 554 using structured content and persona values from an additional tailored version.

Blocks 558-566 may be performed following, or in parallel with, multiple iterations of blocks 552, 554, and 556.

At block 558, the system selects a training instance generated in an iteration of block 554.

At block 560, the system applies the training instance as input to a machine learning model. For example, the machine learning model can have input dimensions that correspond to the dimensions of the training instance input generated at block 5541.

At block 562, the system generates output over the machine learning model based on the applied training instance input. For example, the machine learning model can have output dimensions that correspond to the dimensions of the training instance output generated at block 5541 (e.g., each dimension of the output can correspond to a persona characteristic).

At block 564, the system updates the machine learning model based on the generated output and the training instance output. For example, the system can determine an error based on the output generated at block 562 and the training instance output, and backpropagate the error over the machine learning model.

At block 566, the system determines whether there are one or more additional unprocessed training instances. If so, the system proceeds back to block 558, selects an additional training instance, then performs blocks 560, 562, and 564 based on the additional unprocessed training instance. In some implementations, at block 566 the system may determine not to process any additional unprocessed training instances if one or more training criteria have been satisfied (e.g., a threshold number of epochs have occurred and/or a threshold duration of training has occurred). Although method 500 is described with respect to a non-batch learning technique, batch learning may additionally and/or alternatively be utilized.

A machine learning model trained according to the method of FIG. 5 can thereafter be utilized to predict, based on structured content and/or other content indicated by a creator of a tailored version of an interactive dialog application, persona values for the tailored version. For example, the structured content of FIG. 2 may be provided as input to the model, and a personality persona parameter may be a value of "Teacher" with a probability of 0.8 and "Queen" with a probability of 0.2. This may indicate that, based on the structured content, it is more likely that the user would have interest in the quiz application being provided with a teacher personality than a queen personality.

FIG. 5 is described with respect to one example of a persona selection model that can be generated and utilized. However, additional and/or alternative persona selection models can be utilized in selecting one or more persona values, such as alternatives described herein. Such additional and/or alternative persona selections models may optionally be machine learning models trained based on training instances that vary from those described with respect to FIG. 5.

As one example, a selection model can be generated based on past explicit selections of persona values by various users and such a selection model may additionally or alternatively be utilized in selecting a particular persona value. For instance, in some implementations, indications of multiple persona values may be presented to a user and a user selection of a single persona value of the multiple persona values can be utilized to select the single persona value from the multiple values. Such explicit selections of multiple users can be utilized to generate a selection model. For example, training instances can be generated that are similar to those described above, but the training instance output of each training instance can be generated based on the persona value selected by the user. For instance, for a training instance a "1" (or other "positive value") can be utilized for the output dimension corresponding to the selected personality persona value (such as a "Teacher" personality) and a "0" (or other "negative" value) can be utilized for each of the output dimensions that correspond to all other persona values. Also, for instance, for a training instance a "1" (or other "positive value") can be utilized for the output dimension corresponding to the selected persona value, a "0.5" (or other "intermediate value") can be utilized for the output dimension(s) corresponding to the other persona value(s) presented to the user but not selected, and a "0" (or other "negative" value) can be utilized for each of the output dimensions that correspond to all other persona values. In this and other manners, explicit selections of persona values by users can be leveraged in generating one or more persona selection models.

As mentioned with respect to FIG. 1, indexing module 122 receives structured content from a user and indexes, in index 152, a corresponding tailored version based on one or more entities that are related to the structured content. After the tailored version of the application has been stored with indications of the related entities, natural language input of a subsequent user may be parsed for terms and entities related to the parsed terms may be identified in entity database 154 by entity module 128. By allowing flexibility in indexing user-created applications, the user and/or subsequent users are not required to know an exact invocation phrase. Instead, the indexing module 122 allows a user to "discover" the content by providing natural language input that indicates, for example, the desired subject matter of served content.

Figure 6:
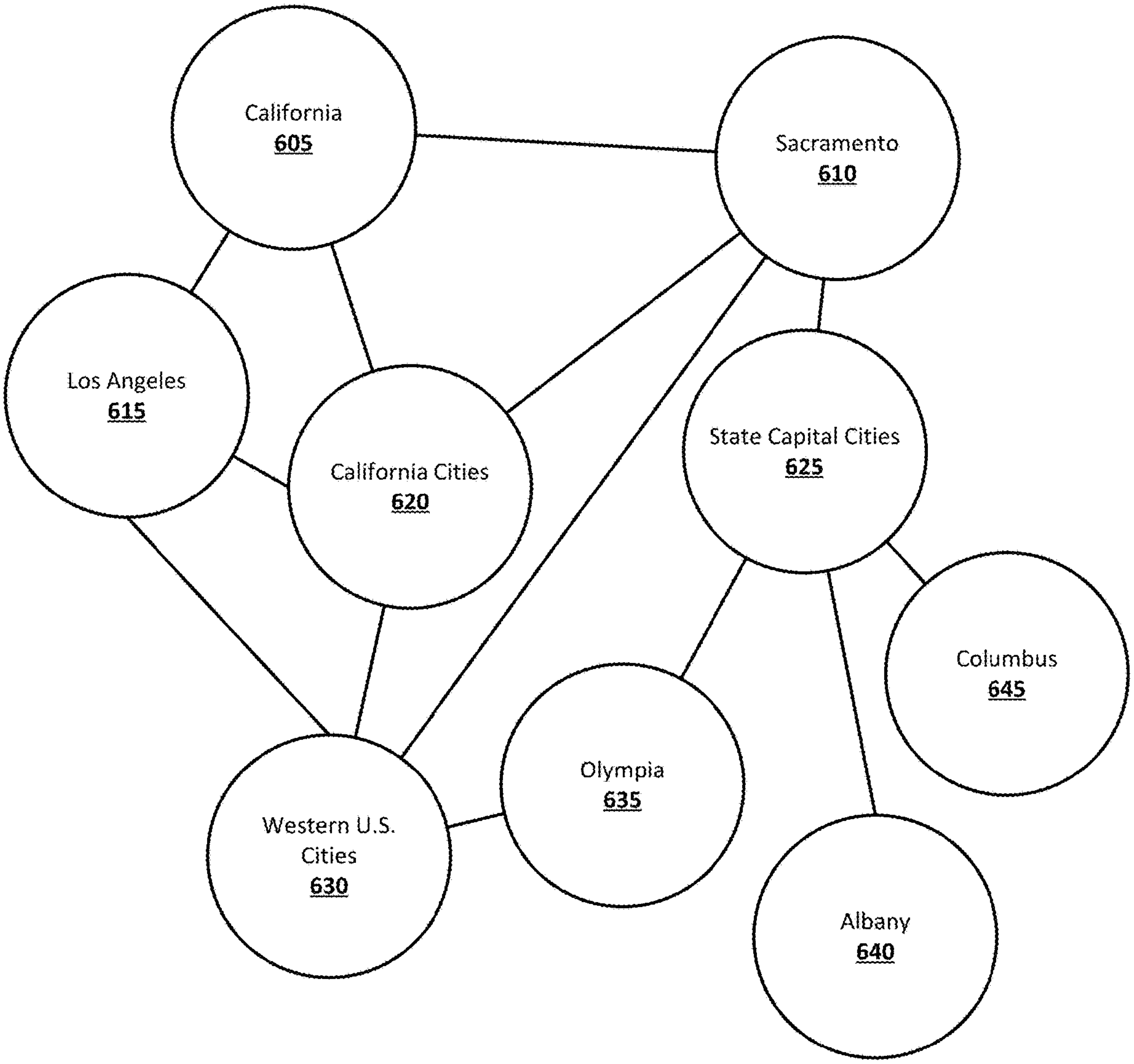
FIG. 6 is an illustration of a graph with nodes representing entities in a knowledge graph.

As a working example, a user may provide structured content for a quiz application that includes questions regarding state capitals. Thus, the answers (both correct and incorrect) may be names of cities, with the questions each including a state name (or vice versa). The structured content may be received by the content input engine 130, as previously described. Further, the structured content may be provided with an indication of a dynamic dialog application and optionally with an invocation phrase to invoke the content in a tailored version of the application in the future. After parsing the structure content, content input engine 130 may provide entity module 128 with the parsed content, which then may identify one or more related entities in entity database 154. Going back to the working example and referring to FIG. 6, a graph of a plurality of nodes is provided. Each of the nodes includes an alias for an entity and is representative of a portion of the entity database 154. The nodes include state capitals, including "Sacramento" 610, "Columbus" 645, "Albany" 640, and "Olympia" 635. Further, the graph includes nodes that represent related entities. For example, all of the state capital nodes are connected to a "state capital cities" node 625.

When structured content related to a state capital quiz application is received, entity module 128 may identify nodes in the graph related to the structured content. For example, the structured content may include a questions prompt of "What is the capital of California?" with possible answers of "Sacramento" and "Los Angeles." The corresponding nodes of the graph may then be identified. Entity module 128 may then provide indexing module 122 with indications of the corresponding nodes and/or with indications of entities that are related to the nodes. For example, the state capital quiz may additionally include the question "What is the capital of New York?," with an answer choice of "Albany," and entity module 128 may identify the node for "State Capital Cities" as a general category linking the nodes for "Sacramento" 610 and "Albany" 640.

In some implementations, entity module 128 may only identify nodes related to some of the structured content. For example, in a quiz application, entity module 128 may only identify nodes that are related to correct answers and not to incorrect answers to avoid associating incorrect entities with the structured content. In some implementations, entity module 128 may further identify entities that are related to the invocation phrase, if provided by the user. For example, the user may provide the invocation phrase of "Capital Cities" and entity module 128 may identify "State Capital Cities" 625.

In some implementations, relationships between the structured content and one or more of the entities may be weighted. For example, entity module 128 may assign a weight to entities identified from correct answers in a quiz application with a score that is more indicative of related than entities that are related to incorrect answers in the structured content. Further, entity module 128 may weigh relationships to categories or other entities based on the number of entities that are related both to the structured content and the entity. For example, for structured content that includes "Sacramento" 610, "Olympia" 635, and "Albany" 640, entity module 128 may weigh the relationship to "State Capital Cities" 625 higher than "Western U.S. Cities" 630 because more of the entities that are related to the structured content are related to "State Capital Cities" 625.

Indexing module 122 then indexes the tailored version of the application with one or more of the entities. In some embodiments, indexing module 122 may index the tailored version of the application with all identified entities. In some implementations, indexing module 122 may index the tailored version with only those entities with relation scores that exceed a threshold. In some implementations, indexing module 122 may utilize one or more training models to determine which of the entities to use in indexing of the tailored version of the application.

Figure 7:
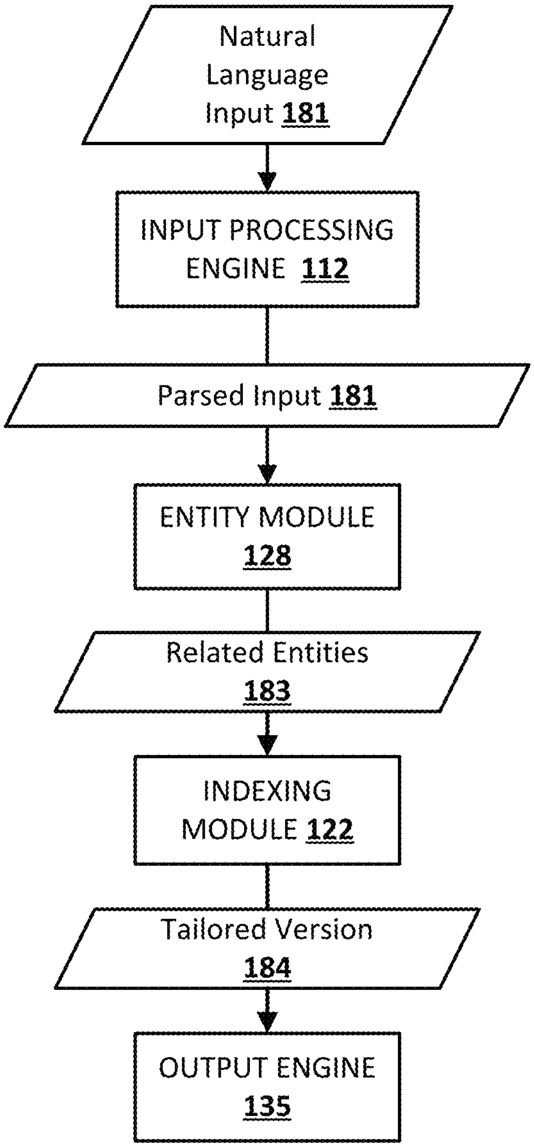
FIG. 7 illustrates an example of indexing a tailored version of an application based on entities related to structured content specified for the tailored version of the application.

Input processing engine 112 may receive natural language input from a user and identify a tailored version of an interactive dialog application to provide to the user based on entities that are indexed with the tailored version. Referring to FIG. 7, natural language input 181 is received by input processing engine 112, as previously described. Input processing engine 112 parses the input to identify one or more terms in the input. For example, a user may speak the phrase "Give me a state capital quiz" and input processing engine 112 may identify terms of "State," "State Capital," and "Quiz" as parsed input 181. Some of the parsed input 181 may be provided to entity module 128, which then identifies one or more related entities 183 in an entity database. In some implementations, entity module 128 may assign weights to the identified entities based on the number of associations between the parsed input 181 and the identified entities.

Indexing module 122 receives the related entities 183 (and associated weights, if assigned) and identifies one or more tailored versions of applications 184 that are indexed by entities that are included in the related entities 183. For example, entity module 128 may identify "State Capital Cities" as an alias for a related entity, and indexing module 122 may identify the example tailored version as the version to provide to the user. In some implementations, indexing module 122 may identify multiple potential versions of the application and select one of the versions based on the weights assigned to the related entities 183 by entity module 128.

In some implementations, indexing module 122 may identify multiple potential versions and may provide the user with a version that includes content from the multiple potential versions. For example, indexing module 122 may identify the "State Capital City" quiz application and may further identify a second "State Capital City" quiz in the tailored content database 158 based on the entities associated with the second version and the related entities. Indexing module 122 can optionally utilize index 122 (FIG. 1) in such identification. Thus, the user may be provided with a hybrid application that includes structured content from multiple sources that is seamlessly presented as a single version, even if unrelated users created the two versions.

Figure 8:
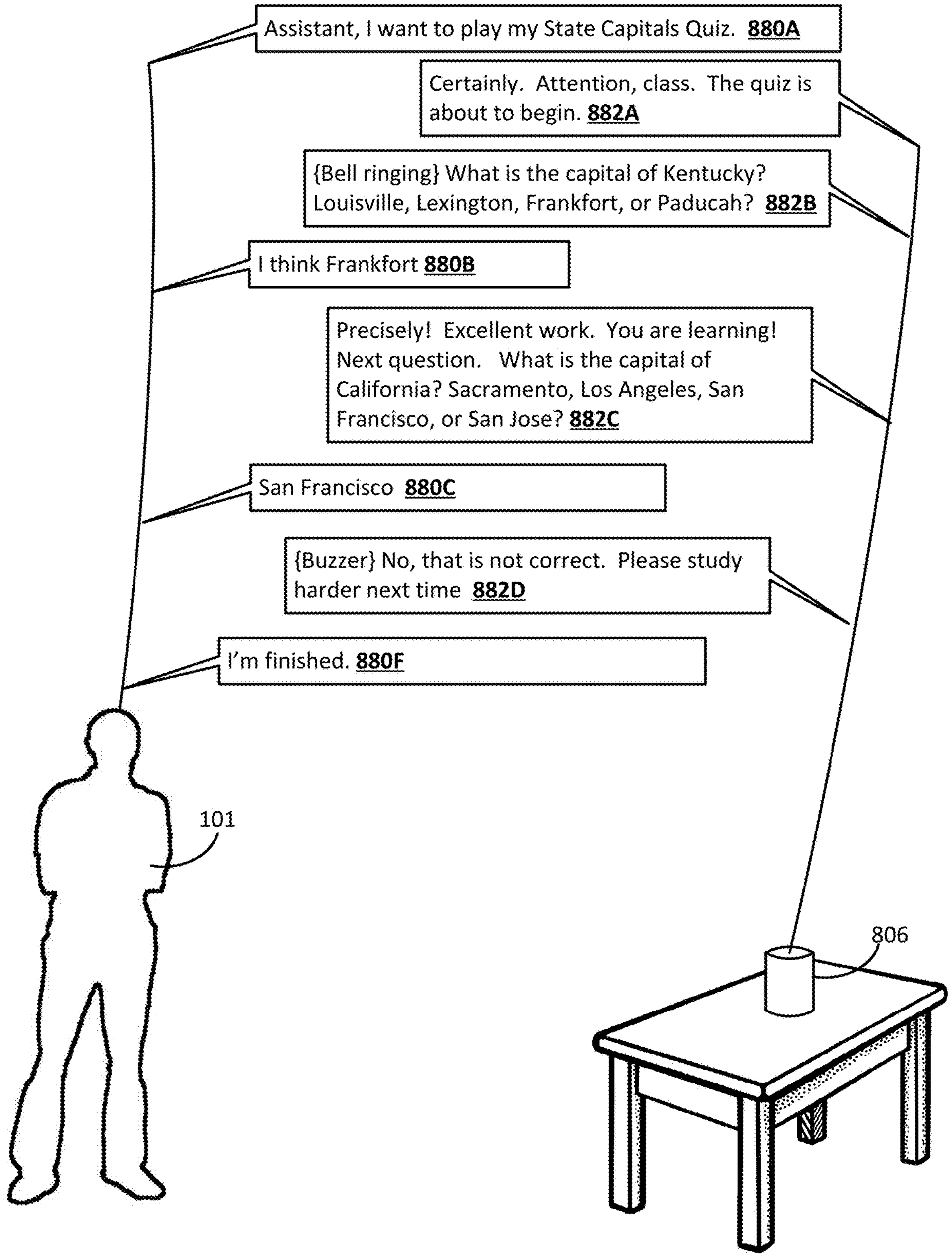
FIG. 8 illustrates a user, a client device, and an example dialog between the user and an automated assistant associated with the client device executing a tailored version of an interactive dialog application, according to implementations disclosed herein.

FIG. 8 illustrates a user 101, a voice-enabled client device 806, and an example of dialog that may occur between the user 101 and an automated assistant associated with the client device 806 with access to a tailored version of the interactive dialog application. The client device 806 includes one or more microphones and one or more speakers. One or more aspects of the automated assistant 110 of FIG. 1 may be implemented on the client device 806 and/or on one or more computing devices that are in network communication with the client device 806. Accordingly, for ease in explanation the automated assistant 110 is referenced in description of FIG. 8.

User input 880A is an invocation phrase for a tailored version of a dynamic interactive quiz application. The input is received by input processing engine 112, which identifies "quiz" as pertaining to a tailored application. Thus, input processing engine 112 provides invocation engine 160 with the parsed input, as described above. In some implementations, invocation engine 160 may determine that the input does not contain an explicit invocation phrase and may provide the indexing module 122 with the input to determine one or more input entities and identify versions indexed by related entity that may be invoked by the provided input.

At output 882A, a prompt is provided. The prompt is provided in a "Teacher" persona and addresses the user as a student in a "class." At output 882B, a non-verbal sound (i.e., a bell ringing) is included in the prompt and may additionally be part of the "Teacher" persona and/or related to one or more persona values. The prompt further includes structured content in the form of a question.

At user input 880B, the user provides an answer. Input processing engine 112 parses the input and provides the parsed input to dialog module 126. Dialog module 126 verifies that the input is correct (i.e., matches the correct answer in the structured content) and generates a new dialog turn to provide to the user. Further, output 882C includes structured content as well as dialog generated based on the persona or persona values associated with the version of the application. The user responds incorrectly at user input 880C and the next output 882D generated by dialog module 126 admonishes the incorrect answer. As an alternative example, if the structured content had indicated that the quiz was more likely for a young child, output 882D may have provided more encouraging words, allowed a second guess, and/or provided a hint to the user instead of the dialog shown in FIG. 8. At user input 880F, the user indicates that a desire to end the application. This may be a standard invocation phrase and/or one of several phrases that indicates to the automated assistant to stop sending input to tailored application.

Figure 9:
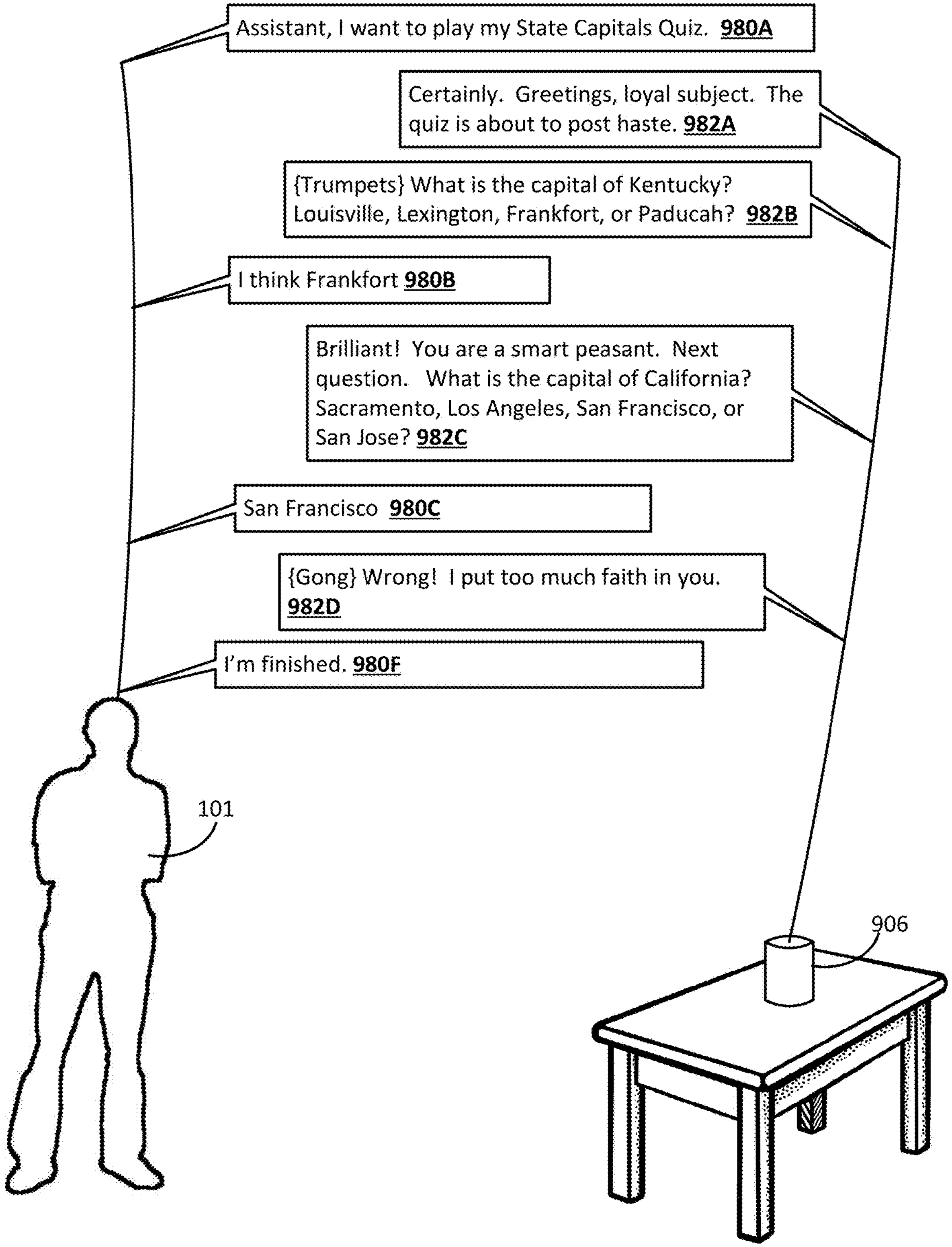
FIG. 9 illustrates a user, a client device, and another example dialog between the user and an automated assistant associated with the client device executing another tailored version of the interactive dialog application of FIG. 8, according to implementations disclosed herein.

FIG. 9 illustrates a user 101, a voice-enabled client device 806, and another example of dialog that may occur between the user 101 and an automated assistant associated with the client device 806 with access to a tailored version of the interactive dialog application with one or more persona values that are different from the persona values of the dialog of FIG. 8, but with the same structured content. At user input 980A, the user invokes the tailored version in the same manner as the dialog in FIG. 8.

At output 982A, a prompt is provided. In this dialog, the tailored version is instead associated with a "Teacher" persona and addresses the user as a "subject" as opposed as "class" in the previous example. Dialog module 126 may identify that a title for the user is required at this output and determine, based on the persona values associated with the version of the application, that the "Queen" persona utilizes "subject" as a name for the user. At output 982B, a different non-verbal sound (i.e., trumpets) is included in the prompt and may additionally be part of the "Queen" persona and/or related to one or more persona values. Dialog module 126 may insert a different sound in the prompts depending on one or more of the associated persona values. The prompt further includes the same structured content in the form of a question.

At user input 980B, the user provides an answer. It is the same answer as previously provided at this user input step in FIG. 8 and dialog module 126 handles the response in the same manner. Further, output 982C includes structured content as well as dialog generated based on the persona or persona values associated with the version of the application, again tailored to match one or more of the persona values selected for the tailored version. The user responds incorrectly at user input 980C and the next output 982D generated by dialog module 126 admonishes the incorrect answer, though using different terms than in FIG. 8. At user input 980F, the user indicates that a desire to end the application. This may be a standard invocation phrase and/or one of several phrases that indicates to the automated assistant to stop sending input to tailored application.

Although some examples described above are described with respect to a trivia interactive dialog application, it is understood that various implementations can be utilized with various types of interactive dialog applications. For example, in some implementations provided structured content can be a bus time table, a train timetable, or other transportation timetable. For instance, the structured content can be a bus time table that includes a plurality of stops (e.g., intersections) and times for each of those stops. The interactive dialog application can include fixed code that enables responses to various queries in a conversational manner. In executing a tailored version that is based on the bus time table, the interactive dialog application can utilize the fixed code in determining what types of responses to provide in response to various queries, and utilize the structured content in determining at least some of the content to provide in various responses to various queries.

Figure 10:
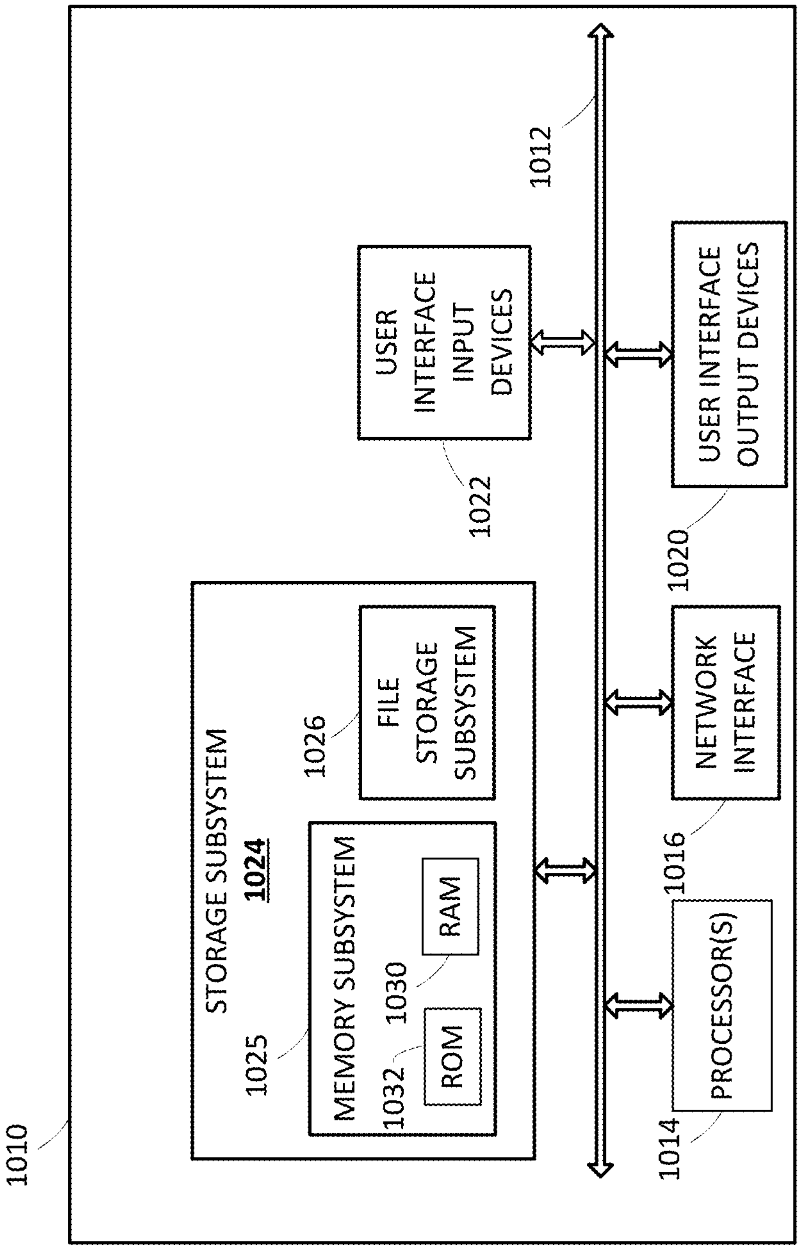
FIG. 10 illustrates an example architecture of a computing device.

FIG. 10 is a block diagram of an example computing device 1010 that may optionally be utilized to perform one or more aspects of techniques described herein. In some implementations, one or more of device 106, automated assistant 110, and/or other component(s) may comprise one or more components of the example computing device 1010.

Computing device 1010 typically includes at least one processor 1014 which communicates with a number of peripheral devices via bus subsystem 1012. These peripheral devices may include a storage subsystem 1024, including, for example, a memory subsystem 1025 and a file storage subsystem 1026, user interface output devices 1020, user interface input devices 1022, and a network interface subsystem 1016. The input and output devices allow user interaction with computing device 1010. Network interface subsystem 1016 provides an interface to outside networks and is coupled to corresponding interface devices in other computing devices.

User interface input devices 1022 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 1010 or onto a communication network.

User interface output devices 1020 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 1010 to the user or to another machine or computing device.

Storage subsystem 1024 stores programming and data constructs that provide the functionality of some or all of the modules described herein. For example, the storage subsystem 1024 may include the logic to perform selected aspects of various methods described herein.

These software modules are generally executed by processor 1014 alone or in combination with other processors. Memory 1025 used in the storage subsystem 1024 can include a number of memories including a main random access memory (RAM) 1130 for storage of instructions and data during program execution and a read only memory (ROM) 1032 in which fixed instructions are stored. A file storage subsystem 1026 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 1026 in the storage subsystem 1124, or in other machines accessible by the processor(s) 1014.

Bus subsystem 1012 provides a mechanism for letting the various components and subsystems of computing device 1010 communicate with each other as intended. Although bus subsystem 1012 is shown schematically as a single bus, alternative implementations of the bus subsystem may use multiple busses.

Computing device 1010 can be of varying types including a workstation, server, computing cluster, blade server, server farm, or any other data processing system or computing device. Due to the ever-changing nature of computers and networks, the description of computing device 1010 depicted in FIG. 10 is intended only as a specific example for purposes of illustrating some implementations. Many other configurations of computing device 1010 are possible having more or fewer components than the computing device depicted in FIG. 10.

In situations in which certain implementations discussed herein may collect or use personal information about users (e.g., user data extracted from other electronic communications, information about a user's social network, a user's location, a user's time, a user's biometric information, and a user's activities and demographic information), users are provided with one or more opportunities to control whether information is collected, whether the personal information is stored, whether the personal information is used, and how the information is collected about the user, stored and used. That is, implementations of the systems and methods discussed herein collect, store and/or use user personal information only upon receiving explicit authorization from the relevant users to do so. For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

The invention claimed is:

1. A method implemented by one or more processors, comprising:
- receiving, via one or more network interfaces:
  - an indication of a dynamic interactive dialog application, and
  - structured content for executing a tailored version of the dynamic interactive dialog application,
    - wherein the structured content comprises a spreadsheet, and
    - wherein the indication and the structured content are transmitted in one or more data packets generated by a client device of a user in response to interaction with the client device by the user;
- storing the structured content in one or more databases based on the indication and based on columns and rows of the spreadsheet;
- processing one or both of: the indication, and the stored structured content, to automatically select a plurality of output response characteristics for the tailored version of the interactive dialog application, wherein the structured content does not explicitly indicate the output response characteristics;
- subsequent to receiving the indication, storing the structured content, and automatically selecting the plurality of output response characteristics:
  - receiving natural language input provided via an assistant interface of the client device or an additional client device of an additional user;
  - determining that the natural language input corresponds to the tailored version of the interactive dialog application; and in response to determining that the natural language input corresponds to the tailored version of the interactive dialog application:

executing the tailored version of the interactive dialog application, wherein executing the tailored version of the interactive dialog application comprises generating one or more instances of output for presentation via the assistant interface, each of the one or more instances of output being for a corresponding dialog turn during execution of the interactive dialog application and being generated based on the structured content and based on one or more of the plurality of output response characteristics.

2. The method of claim 1, wherein the natural language input lacks any invocation phrase for the tailored version of the interactive dialog application.

3. The method of claim 2, wherein determining that the natural language input corresponds to the tailored version of the interactive dialog application comprises:

determining that one or more terms of the natural language input correspond to the structured content of the tailored version.

4. The method of claim 3, wherein determining that the one or more terms of the natural language input correspond to the structured content of the tailored version comprises determining that the one or more terms correspond to an entity that is inferred from the structured content of the tailored version.

5. The method of claim 1, wherein processing one, or both, of the indication and the structured content to automatically select the plurality of output response characteristics comprises:

applying, as input to a trained machine learning model, one or both of the indication and at least some of the structured content;

processing the input using the trained machine learning model to generate one or more output values; and selecting the output response characteristics based on the one or more output values.

6. The method of claim 1, wherein the one or more of the plurality of the output response characteristics include one or more grammar characteristics.

7. The method of claim 1, wherein the one or more of the plurality of the output response characteristics include one or more graphical properties.

8. A method implemented by one or more processors, comprising:

receiving, via one or more network interfaces:

an indication of a dynamic interactive dialog application, and structured content for executing a tailored version of the dynamic interactive dialog application, wherein the structured content comprises a spreadsheet, and wherein the indication and the structured content are transmitted in one or more data packets generated by a client device;

storing the structured content in one or more databases based on the indication and based on columns and rows of the spreadsheet;

subsequent to receiving the indication and storing the structured content:

receiving natural language input provided via an assistant interface of the client device or an additional client device, wherein the natural language input does not explicitly invoke the tailored version of the interactive dialog application;

determining that the natural language input corresponds to the tailored version of the interactive dialog application, wherein determining that the natural language input corresponds to the tailored version of the interactive dialog application comprises:

accessing an index that maps, to the tailored version of the interactive dialog application, content determined based on the structured content;

determining that one or more terms of the natural language input correspond to the content; and selecting the tailored version of the interactive dialog application for execution based on determining that one or more terms of the natural language input correspond to the content;

in response to selecting the tailored version of the interactive dialog application for execution:

executing the tailored version of the interactive dialog application, wherein executing the tailored version of the interactive dialog application comprises generating one or more instances of output for presentation via the assistant interface, each of the one or more instances of output being for a corresponding dialog turn during execution of the interactive dialog application and being generated using the structured content.

9. The method of claim 8, wherein the content comprises an entity that is inferred from the structured content, and wherein determining that the one or more terms of the natural language input correspond to the content comprises determining that the one or more terms correspond to the entity that is inferred from the structured content of the tailored version.

10. The method of claim 8, further comprising:

determining the entity that is inferred from the structured content, wherein determining the entity that is inferred from the structured content comprises:

identifying at least a first entity in the structured content, and determining the entity based on the entity being related to the first entity in an entity database.

11. The method of claim 10, wherein determining the entity that is inferred from the structured content further comprises:

identifying at least a second entity in the structured content, and determining the entity based on the entity being related to the first entity and being related to the second entity in the entity database.

12. A system of one or more computing devices, the system comprising:

one or more databases;

memory storing instructions;

one or more processors operable to execute instructions stored in the memory to cause the one or more processors to:

receiving, in one or more data packets generated by a client device:

an indication of a dynamic interactive dialog application, and structured content for executing a tailored version of the dynamic interactive dialog application, wherein the structured content comprises a spreadsheet;

store the structured content in the one or more databases based on the indication and based on columns and rows of the spreadsheet;

process one or both of: the indication, and the stored structured content, to automatically select a plurality of output response characteristics for the tailored version of the interactive dialog application, wherein the structured content does not explicitly indicate the output response characteristics;

subsequent to receiving the indication, storing the structured content, and automatically selecting the plurality of output response characteristics:

receive natural language input provided via an assistant interface of the client device or an additional client device of an additional user;

determine that the natural language input corresponds to the tailored version of the interactive dialog application; and in response to determining that the natural language input corresponds to the tailored version of the interactive dialog application:

execute the tailored version of the interactive dialog application, wherein executing the tailored version of the interactive dialog application comprises generating one or more instances of output for presentation via the assistant interface, each of the one or more instances of output being for a corresponding dialog turn during execution of the interactive dialog application and being generated based on the structured content and based on one or more of the plurality of output response characteristics.

13. The system of claim 12, wherein the natural language input lacks any invocation phrase for the tailored version of the interactive dialog application.

14. The system of claim 13, wherein the instructions to determine that the natural language input corresponds to the tailored version of the interactive dialog application comprise instructions to:

determine that one or more terms of the natural language input correspond to the structured content of the tailored version.

15. The system of claim 14, wherein the instructions to determine that the one or more terms of the natural language input correspond to the structured content of the tailored version comprise instructions to determine that the one or more terms correspond to an entity that is inferred from the structured content of the tailored version.

16. The system of claim 14, wherein the one or more of the plurality of the output response characteristics include one or more grammar characteristics.

17. The system of claim 14, wherein the one or more of the plurality of the output response characteristics include one or more graphical properties.

* * * * *